United States Patent
Thompson et al.

(10) Patent No.: US 7,095,231 B2
(45) Date of Patent: Aug. 22, 2006

(54) METHOD OF AND SYSTEM FOR LOCATING A SINGLE PASSIVE UNDERGROUND ELECTRONIC MARKER TYPE THAT DISTINGUISHES FALSE INDICATION CAUSED BY OTHER MARKER TYPES

(75) Inventors: James W. Thompson, Mineral Wells, TX (US); William C. Wood, Fort Worth, TX (US)

(73) Assignee: Tempo Research Corporation, Vista, CA (US)

( * ) Notice: Subject to any disclaimer, the term of this patent is extended or adjusted under 35 U.S.C. 154(b) by 156 days.

(21) Appl. No.: 10/800,300

(22) Filed: Mar. 11, 2004

(65) Prior Publication Data
US 2004/0178795 A1 Sep. 16, 2004

Related U.S. Application Data

(60) Provisional application No. 60/454,491, filed on Mar. 12, 2003.

(51) Int. Cl.
*G01V 3/11* (2006.01)
*G01V 3/165* (2006.01)

(52) U.S. Cl. .................................. 324/326; 324/329

(58) Field of Classification Search ................ 324/67, 324/326–329; 340/686.6, 551, 552
See application file for complete search history.

(56) References Cited

U.S. PATENT DOCUMENTS

| | | | | |
|---|---|---|---|---|
| 3,471,772 A | * | 10/1969 | Smith | 324/329 |
| 5,093,622 A | * | 3/1992 | Balkman | 324/326 |
| 5,430,379 A | * | 7/1995 | Parkinson et al. | 324/329 |
| 5,471,143 A | * | 11/1995 | Doany | 324/326 |
| 5,699,048 A | | 12/1997 | Galloway | 340/572 |
| 5,754,049 A | * | 5/1998 | Howell | 324/326 |
| 6,097,293 A | | 8/2000 | Galloway | 340/572.8 |
| 6,380,857 B1 | | 4/2002 | Galloway | 340/572.8 |
| 6,388,575 B1 | | 5/2002 | Galloway | 340/572.1 |
| 6,407,550 B1 | * | 6/2002 | Parakulam et al. | 324/326 |
| 2005/0159929 A1 | * | 7/2005 | Overby et al. | 702/189 |

* cited by examiner

*Primary Examiner*—Jay M. Patidar
(74) *Attorney, Agent, or Firm*—Pillsbury Winthrop Shaw Pittman LLP

(57) ABSTRACT

A method of and system for locating a single passive underground marker type may distinguish false indications caused by other marker types. In accordance with aspects of the present invention, minimization or elimination of false marker indications may be accomplished by processing the response from a marker to determine which frequency has the largest response.

9 Claims, 3 Drawing Sheets

METHOD OF AND SYSTEM FOR LOCATING A SINGLE PASSIVE UNDERGROUND ELECTRONIC MARKER TYPE THAT DISTINGUISHES FALSE INDICATION CAUSED BY OTHER MARKER TYPES

CROSS-REFERENCE TO RELATED APPLICATIONS

The present application claims the benefit of U.S. provisional application Ser. No. 60/454,491, filed Mar. 12, 2003, entitled "METHOD OF AND SYSTEM FOR LOCATING A SINGLE PASSIVE UNDERGROUND ELECTRONIC MARKER TYPE THAT DISTINGUISHES FALSE INDICATION CAUSED BY OTHER MARKER TYPES," the disclosure of which is incorporated herein by reference in its entirety.

FIELD OF THE INVENTION

Aspects of the present invention relate generally to the field of locating passive underground electronic markers, and more particularly to a method of and system for locating a single passive underground marker type that distinguishes false indications caused by other marker types.

BACKGROUND OF THE INVENTION

The locations of underground utilities such as power, water, sanitary, telephone, gas, cable television (CATV), and non-potable may be marked with devices known as passive underground electronic markers. Typically, each marker contains one or more Inductor-Capacitor (LC) circuits, or equivalent circuitry, each of which is tuned to a unique frequency associated with a particular utility type. In that regard, each circuit typically includes a coil of wire that responds to reception of a signal transmitted at a particular frequency. The markers are buried in a trench with the utility structure to be located during surveying, maintenance operations, or other activities requiring precise location of the utility.

In order to locate a buried marker, an operator moves across the surface of the ground with a locator, which typically includes both a transmitter and a receiver. The transmitter sends out an electromagnetic signal tuned to the unique frequency of the marker associated with a particular utility type. Upon receiving the transmitted signal, the marker resonates and thus produces an electromagnetic response to the transmitted signal. This response is received by the receiver and converted to a signal that is detectable by the operator. The operator may mark the pinpointed location on the ground using chalk, paint, or other surface marking indicia, and then move on to find the next marker buried along the utility structure. Examples of passive marker and locator systems are disclosed U.S. Pat. Nos. 5,699,048, 6,097,293, 6,380,857 and 6,388,575, the disclosures of which are incorporated herein by reference.

The locator sends out a specific frequency that is the same frequency as the marker sought to be identified. Electronic markers sensitive to the transmitted frequency will be stimulated. A common problem associated with conventional utility marker location technologies arises due to the fact that markers associated with other utility types (i.e., different from the type sought to be identified) may be stimulated and respond to the transmitted frequency as well. Current marker locators receive signals back from any marker that has been stimulated. The response from those markers not at the transmit frequency have a detectable signature or response characteristic. The amplitude of this response generally decreases as the transmit frequency gets further from the resonant frequency of the marker.

Problematically, current locators cannot determine that the response received at a particular transmit frequency is from a different marker type from the marker type intended to be detected. In that regard, the response from a particular marker decreases as the distance between the marker and the locator increases; mathematically, the response can be expressed as the function $1/r^4$, where r is the distance between the marker and locator. In accordance with the $1/r^4$ response signal loss, a marker at the wrong frequency, but at a distance of only six inches from the locator, can have a greater response at the detection frequency than the correct frequency marker at a distance of five feet.

SUMMARY

A locator apparatus and system operative in accordance with one aspect of the present invention do not provide false indications from markers other than those designed to respond at the transmit frequency. In some embodiments, minimization or elimination of false marker indications may be accomplished by processing the response from a marker to determine which frequency has the largest response. If the response is greater at one of the other marker frequencies, it can be determined that a response at the locator's transmit frequency is false.

A locator constructed in accordance with the present disclosure may generally include a transmit section, a receive section, a processing and control section, and a user interface section. The transmitting section transmits an RF (or other appropriate) signal at a selected marker frequency. The receive section receives a signal returned from a stimulated marker. The processing section determines and analyzes the frequency distribution of the received signal and determines if the greatest frequency response of the stimulated marker is at the selected marker frequency. If the greatest frequency response is at the selected marker frequency, the user interface section indicates the presence of the selected marker type. If the greatest frequency response is not at the selected marker frequency, then the user interface may indicate the presence of no marker.

The processing section may process the received signal in any several ways. A first method of processing the response from the marker to determine if it is a false response is to use synchronous detection. Synchronous detection can be accomplished at each frequency to determine if a marker is returning a greater response at a frequency other than the transmit frequency. Synchronous detection is a known method of detecting a specific frequency.

Another method of determining the frequency at which the marker has the greatest response is to use a Fast Fourier Transform (FFT). The use of a FFT or similar function (such as Bessel functions, for example) can facilitate determination of the overall frequency response of the marker. From the frequency response, the determination can be made if the response is greatest at the transmit frequency.

A third method of determining the frequency at which a marker has the greatest response is to pass the response in parallel through narrow-band filters at each marker frequency. The response characteristics out of the filters will generally indicate the frequency with the greatest signal response.

After the locator has used one or more of the methods described to determine which marker frequency has the largest response, other processing may be performed. Accordingly, the locator can indicate nothing, for example, by ignoring the located marker and not providing a false indication. Alternatively, the type of marker detected can be indicated, prompting manual switching, or allowing automatic switching, of the locator's transmit frequency to that marker frequency.

In some alternative embodiments, a locator configured and operative to prevent false indications may transmit on several frequencies after detecting a response from a marker; a false response can be determined if the greatest signal response is not the desired marker type. The transmitter may also transmit a very broad bandwidth pulse to stimulate all marker types equally to determine if the response from a particular marker is a false response.

DETAILED DESCRIPTION

Figure 1:
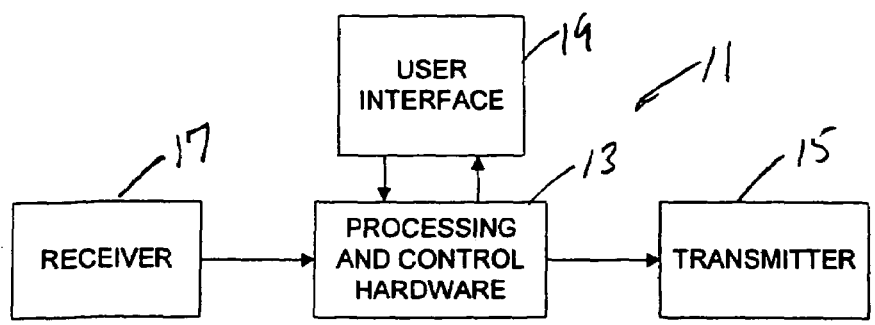
FIG. 1 is a simplified block diagram illustrating components of a system constructed in accordance with one embodiment of the present invention.

Referring now to the drawings and first to FIG. 1, one embodiment of a system according to the present disclosure is designated generally by reference numeral 11. System 11 may include processing and control hardware 13, which generally includes a microprocessor, digital storage, and other processing and control components that may vary in accordance with system requirements or desired functionality. Processing and control hardware 13 may control a transmitter 15 and a receiver 17.

Transmitter 15 may be configured to transmit on any of several selected frequencies under control of processing and control hardware 13; it will be appreciated that, while radio frequency (RF) signals are one form of signal provided by transmitter 15, other signals from various portions of the electromagnetic spectrum (such as microwave signals, for example) may be used in some applications. Processing and control hardware 13 may receive signals from receiver 17. As noted above with reference to transmitter 15, receiver 17 may be configured and operative to receive signals having frequencies in selected portions of the electromagnetic spectrum, such as RF or microwave signals. The operative frequencies or frequency ranges for transmitter 15 and receiver 17 may be influenced by the type of marker technology employed, for example.

A user interface, indicated generally at 19, may be electrically connected or coupled to processing and control hardware 13. User interface 19 may include user input devices, such as keypads, keyboards, or various pointing devices, for example, allowing user input of data, commands, or instructions to processing and control hardware 13. In some embodiments, user interface 19 also includes display hardware, such as a display screen, for displaying information to a user. It will be appreciated that input and output functionality of user interface 19 may be combined, for example, in a touch-sensitive display screen or other multi-function input/output apparatus.

In some embodiments, system 11 may be implemented as a unitary or integrated portable device that may be carried, rolled, or otherwise moved by a user.

Figure 2:
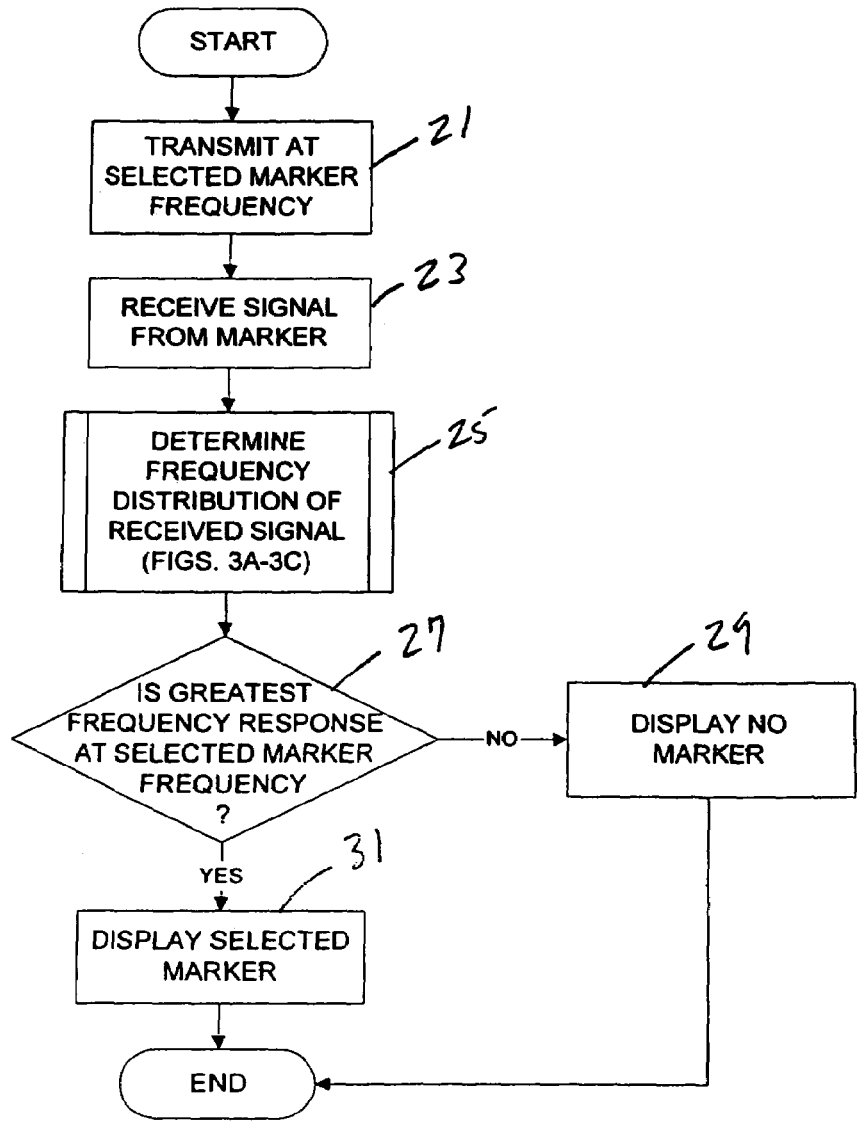
FIG. 2 is a flowchart illustrating the general operation of one embodiment of a method of locating a selected marker.

Referring now to FIG. 2, there is illustrated a simplified flowchart depicting the operation of one exemplary embodiment of a method of locating a selected marker. As indicated at block 21, transmitter 15 may transmit at a selected marker frequency. As indicated at block 23, receiver 17 may receive a signal returned from a marker. As indicated generally at block 25, processing and control hardware 13 may determine a frequency distribution of the received signal. As set forth below, various frequency distribution determination processes are described in detail with specific reference to FIGS. 3A–3C. After determining the frequency distribution of the received signal, processing and control hardware 13 may determine if the greatest frequency response of the received signal is at the selected marker frequency as indicated at decision block 27. If not, no marker is displayed at user interface 19, as indicated at block 29. If the greatest frequency response is at the selected marker frequency, then the presence of the selected marker may be displayed on user interface 19 as indicated at block 31.

Figure 3A:
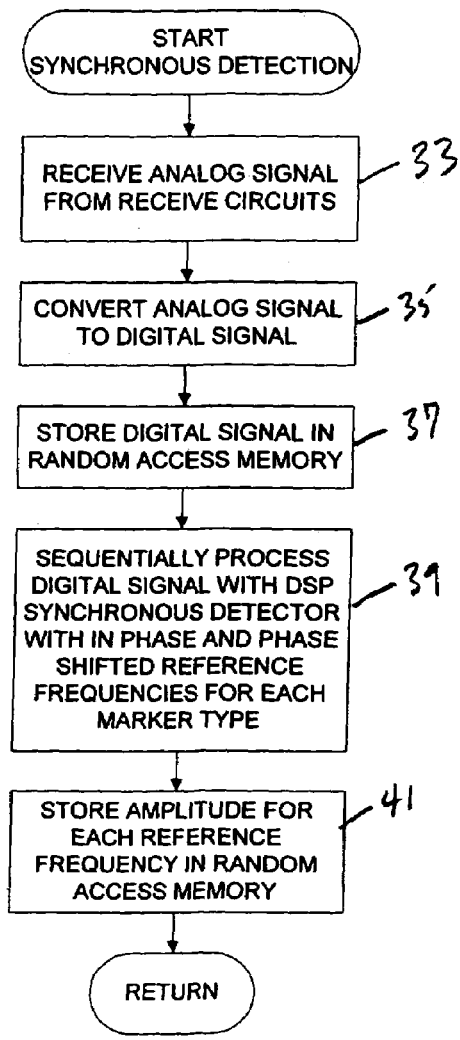
FIG. 3A is a flowchart of a synchronous detection process for determining a response frequency distribution.

Referring now to FIG. 3A there is illustrated a synchronous detection process for determining a response frequency distribution. Processing and control hardware 13 may receive an analog signal from the receive circuits of receiver 17, as indicated at block 33. The system may then convert the analog signal to a digital signal at block 35. The digital signal may be stored, for example, in random access memory or on some other type of data storage medium, as indicated at block 37. Then the system may sequentially process the digital signal, for instance, using a digital signal processor (DSP) synchronous detector, as indicated at block 39. In the exemplary FIG. 3A embodiment, the DSP synchronous detector processes the stored digital signal with in-phase and phase-shifted frequency references for each marker type. Synchronous detection methodologies are generally known to those skilled in the art. The DSP synchronous detector may produce an amplitude value for each reference frequency; an amplitude value for each reference frequency may be stored, such as in random access memory, as indicated at block 41. The reference frequency having the highest amplitude is the one for the marker type that has been located. The data stored at block 41 may be returned to FIG. 2 for additional processing.

Figure 3B:
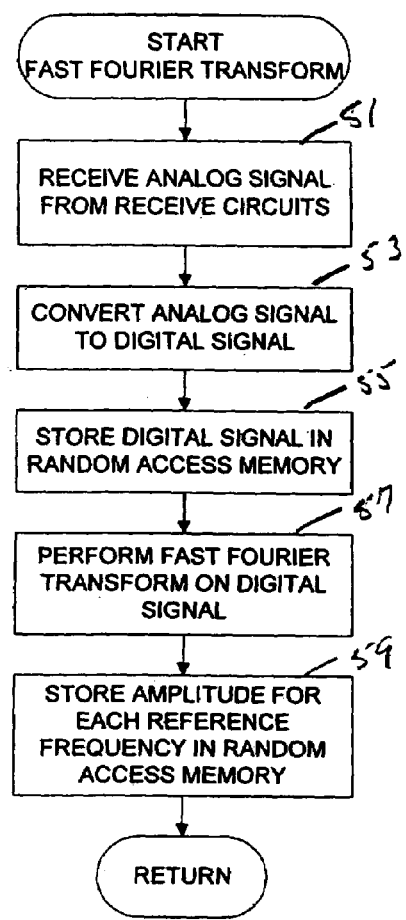
FIG. 3B is a flowchart of a Fast Fourier Transform process for determining a response frequency distribution.

Referring now to FIG. 3B, there is illustrated a flowchart depicting a Fast Fourier Transform (FFT) process for determining a response frequency distribution. The system may receive an analog signal at block 51. The analog signal may be converted to a digital signal (block 53) which may then be stored, for example, in random access memory (block 55). The system may then perform a Fast Fourier Transform on the digital signal as indicated at block 57. As is well known to those skilled in the art, the Fast Fourier Transform converts the digital signal from the time domain to the frequency domain. The system may ascertain and store an amplitude value for each reference frequency determined by the Fast Fourier Transform in random access memory as indicated at block 59. Data stored at block 59 may be returned to FIG. 2 for additional processing. As indicated above, other functions, such as Bessel functions, for example, may provide similar utility as the FFT described above.

Figure 3C:
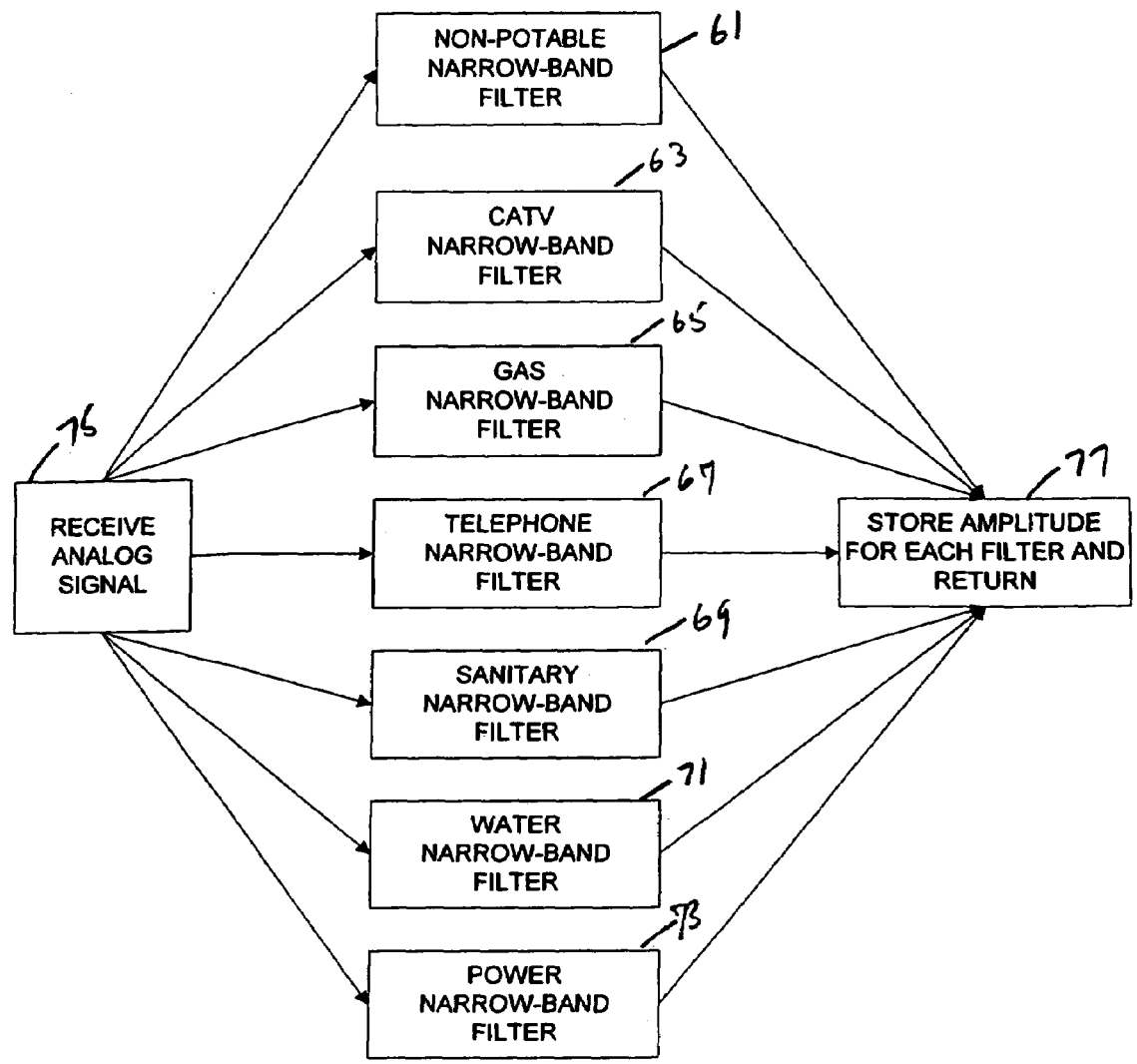
FIG. 3C is a block diagram of a multiple filter process for determining a response frequency distribution.

Referring now to FIG. 3C, there is illustrated a multiple filter process for determining a response frequency distribution. The system may include a non-potable narrow-band filter 61, a CATV narrow-band filter 63, a gas narrow-band filter 65, a telephone narrow-band filter 67, a sanitary narrow-band filter 69, a water narrow-band filter 71, and a power narrow-band filter 73. Each narrow-band filter 61–73 includes circuitry for passing a narrow-band of frequencies at or near a reference frequency for its associated respective marker type. It will be appreciated that the number and arrangement of filters 61–73 may vary, for instance, depending upon the types of markers a particular locator is intended to locate, overall flexibility desired, and other factors.

The system may receive an analog signal from receiver 17, indicated generally at block 75, substantially as set forth in detail above. In the exemplary embodiment, the received analog signal may be passed, in parallel, through each of narrow-band filters 61–73. The amplitude of the signal through each filter may be received as indicated at block 77. The amplitude values received at block 77 may then be returned to FIG. 2 for additional processing.

Aspects of the present invention have been illustrated and described in detail with reference to particular embodiments by way of example only, and not by way of limitation. It will be appreciated that various modifications and alterations may be made to the exemplary embodiments without departing from the scope and contemplation of the present disclosure. It is intended, therefore, that the invention be considered as limited only by the scope of the appended claims.

What is claimed is:

1. A method of locating a selected type of passive electronic marker, said method comprising:

transmitting a signal at a frequency associated with the selected type of passive electronic marker;

receiving a signal from the marker;

determining a frequency distribution of the received signal by performing synchronous detection on the signal received during said receiving;

indicating presence of the selected type of passive electronic marker if, responsive to said determining, the frequency having the greatest amplitude is the frequency associated with the selected type of passive electronic marker; and preventing an indication for other passive electronic marker types associated with a frequency having less than the greatest amplitude.

2. The method as claimed in claim 1, further including:

indicating absence of the selected type of passive electronic marker if, responsive to said determining, the frequency with the greatest amplitude is not the frequency associated with the selected type of passive electronic marker.

3. The method as claimed in claim 1, wherein said performing synchronous detection on the received signal includes:

converting the received signal to a digital signal; and sequentially processing the digital signal with in-phase and phase-shifted reference frequencies.

4. The method as claimed in claim 1, wherein said determining includes performing a Fourier Transform on the signal received during said receiving.

5. The method as claimed in claim 1, wherein said determining includes passing the signal received during said receiving through parallel narrow-band filters.

6. A system for locating a selected type of passive electronic marker; said system comprising:

a transmitter for transmitting a signal at a frequency associated with the selected type of passive electronic marker;

a receiver for receiving the signal from the marker;

a processor coupled to the receiver for determining a frequency distribution of the received signal by performing synchronous detection on the received signal; and a display unit for indicating presence of the selected type of passive electronic marker if a frequency with the greatest amplitude determined by the processor is associated with the selected type of passive electronic marker, wherein said display unit prevents an indication for other passive electronic marker types associated with a frequency having less than the greatest amplitude.

7. The system as claimed in claim 6, wherein said performing synchronous detection on the received signal includes a digital signal processor synchronous detector.

8. The system as claimed in claim 6, wherein said processor performs a Fourier Transform on the received signal.

9. The system as claimed in claim 6, wherein said processor utilizes parallel narrow-band filters to determine the frequency distribution.

* * * * *